April 18, 1967 A. E. LEFEVRE 3,315,263
REMOTE-CONTROL DEVICE
Filed Nov. 15, 1963 2 Sheets-Sheet 1

INVENTOR
Albert Emile Lefevre
BY
Karl W. Flocks
ATTORNEY

United States Patent Office 3,315,263
Patented Apr. 18, 1967

3,315,263
REMOTE-CONTROL DEVICE
Albert Emile Lefevre, Verneuil-en-Halatte, France, assignor to Charbonnages de France, Paris, France, a public institution of France
Filed Nov. 15, 1963, Ser. No. 324,909
Claims priority, application France, Nov. 16, 1962, 915,713
3 Claims. (Cl. 343—225)

The present invention relates to a remote-control device, more particularly adapted for the distant control of mining machines which are required to operate under conditions of safety in inflammable atmospheres.

The device according to the invention has the essential advantage that it is possible to ensure, without any physical connection, the remote control of machines of the kind referred to at a distance which is sufficiently great to avoid any direct or indirect danger for the operator and also to prevent any unauthorized person from using the transmitter of the remote-control signals.

The remote-control device according to the invention is essentially constituted:

By a portable high-frequency transmitter of low power, the carrier wave of which is modulated in amplitude by a certain number of frequencies which each correspond to a function of the remote-controlled machine;

By a power supply source constituted by the usual accumulator carried by the coal miners, comprising an additional current-limiting circuit;

By a high-frequency coupler constituted by a helmet having at least one metallized face insulated from the operator by the insulating cap and a metal element in contact with the operator's forehead, the said coupler permitting the transmission of signals emitted by the transmitter by capacity coupling with an insulated conductor, the earth return being ensured through the intermediary of the operator's body;

By an electric coupling comprising: on the one hand a fixed cable betwen the accumulator and the head of the cap lamp, the hook of which is connected to the metallized face of the helmet and the return contact is connected to the metal element which is in contact with the operator's forehead, and on the other hand, a cable provided with a plug-in coupling capable of being fitted on the transmitter or on the accumulator so as to permit both the supply of this latter and the re-charging of the accumulator and the transmission of the signals emitted, between the transmitter and the helmet aerial.

Other particular features, advantages and special aspects of the present invention will be brought out from the description which follows below, reference being made to the accompanying drawing, in which.

Figure 1:
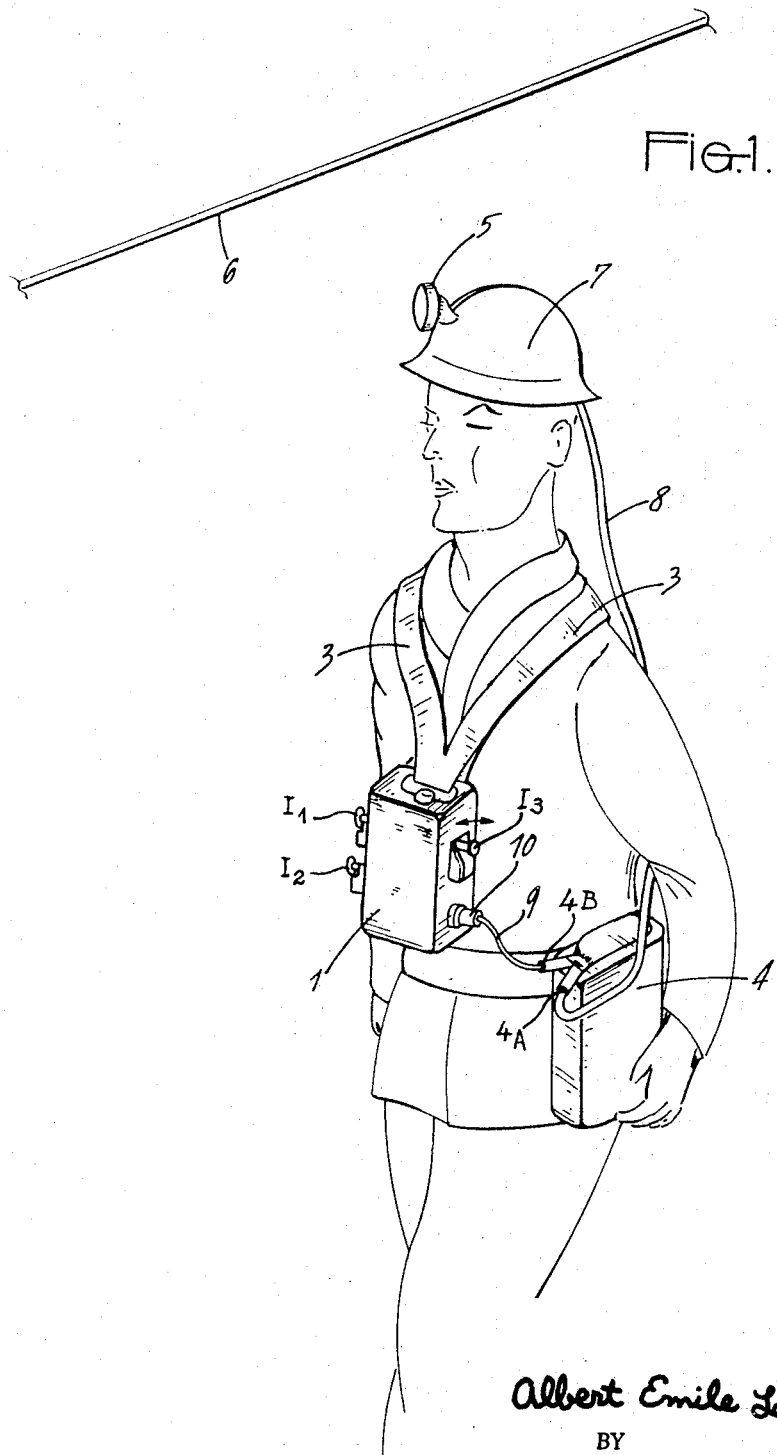
FIG. 1 shows the manner in which an operator can use a remote-control transmitter unit in accordance with the invention.

For the purposes of example and without any implied limitation, it will be assumed that the invention is applied to a coal-cutting machine or other coal mining machine which, in addition to the safety reasons proper to all machines used under difficult conditions, produces a large quantity of dust which is particularly troublesome.

The apparatus according to the invention has the effect of permitting the operator of a machine of this kind to control this machine from a distance within sight but at a sufficient distance, for example of the order of several metres, to avoid any direct or indirect danger.

The apparatus according to the invention can be generally defined as a unit which makes it possible to ensure, without any physical contact and with complete safety, the remote control of one or more electric relay circuits.

More specifically, the whole of the apparatus according to the invention comprises:

A portable high-frequency transmitter, designated by the general reference 1 of low power, the carrier-wave of which is amplitude-modulated, as will be described in detail later, by a certain number of low frequencies, each corresponding to a definite function of the remote-controlled machine. In the case of a coal-cutting machine, these functions may be for example: "higher" position of the cutting arm, "lower" position of the same mining arm, forward running at maximum speed (faster), forward running at low speed (slower), etc.

To this end, the operator has available a keyboard of control knobs, such as the knobs $I_1$ (higher), $I_2$ (lower), $I_3$ (faster-slower), each of which corresponds to a definite function of the machine. In the example described, the knobs $I_1$ and $I_2$ are knobs with an interlock "working" position, $I_3$ being a knob with two non-interlock "working" positions which are symmetrical with respect to the position of rest.

A fixing means, such as for example, a pair of braces 3 is of course provided so as to fix the transmitter on the operator's chest:

A source of current constituted according to one particular feature of the invention by the accumulator or battery 4 of the cap lamp 5 which is carried by miners on the bottom workings;

A high-frequency coupling device permitting the transmission of the signals emitted by the transmitter 1, inside an underground gallery by capacitor coupling with an insulated conductor 6, the earth return being effected through the intermediary of the operator's body. In the example shown, the form of construction has been adopted in which the coupler is constituted by the helmet 7 of the operator, as will be described later;

An electric coupling comprising on the one hand a cable 8 fixed between the accumulator 4 and the cap lamp 5, and on the other hand a cable 9 provided with a plug-in coupling adapted to connect the accumulator to the transmitter 1. The particular arrangement of this electric coupling will be described in more detail below.

There will now be described in more detail, with particular reference to FIG. 2, a possible electric diagram of connections of a remote-control transmitter unit according to the invention.

In accordance with the foregoing, the transmitter 1 is essentially constituted:

By a high-frequency pilot oscillator built round the transistor $T_4$, by the primary of the transformer $T_{r2}$ tuned to the transmitter frequency by means of the condenser $C12$ and the assembly of the condenser $C11$ and resistance $R11$;

By a low-frequency oscillator built round the transistor $T_1$, the low-frequency being fixed by the connection in parallel on the primary of the transformer $T_{r1}$ of one of the condensers $C_1$, $C_2$, $C_3$, $C_4$, by means of one of the knobs $I_1$, $I_2$ or $I_3$ referred to above;

By a low-frequency separator amplifier composed of the direct-coupled transistors $T_2$ and $T_3$; this amplifier modulates in amplitude the high-frequency emitted by the pilot oscillator by injecting the low-frequency at the point A of the primary of the transformer $T_{r2}$.

The high-frequency thus modulated is applied through the intermediary of the transformer $T_{r2}$ to a symmetrical low-frequency output stage composed of the transistors $T_5$ and $T_6$ and the output transformer $T_{r3}$.

The high-frequency signal is thus available at the terminal 10B of the connector 10, the tuning being effected on the side comprising the helmet-aerial 7, as will be seen later.

There will be noted in the transmitter the unit $C_{14}$–$R_{14}$–$C_{16}$ which forms a filter to prevent the return of the modulated high-frequency into the low-frequency oscillator.

On the other hand, it will be observed that the terminal 10A of the connector 10 is connected to the earth of the casing 2 of the transmitter 1.

According to a particular feature of the invention, an additional frequency, in the present case a fifth frequency range, is transmitted as a positive safety measure, by a condenser $C_5$ continuously connected in parallel on the primary of the transformer $T_{r1}$ without the interposition of any control knob. If the transmitted frequencies, and in particular the frequency transmitted by the circuit $T_{r1}$–$C_5$ are acoustic, it can be seen that before going down, the operator can check by ear the correct operation of the apparatus by means of an appropriate receiver.

As has been succinctly stated above, the accumulator 4 comprises:

An output 4A passing through the fixed cable 8 to the head of the cap lamp 5;

An output 4B passing through the cable 9 to the plug-in coupling 10 provided on the casing of the transmitter 1.

Each of the cables 8 and 9 comprises three conductors shown respectively by 8A, 8B, 8C and by 9A, 9B, 9C, and the plug 10 comprises three male elements 10A, 10B, 10C and three female elements 10A′, 10B′, 10C′. The elements 10A′ and 10C′ of the plug-in unit 10 provide access to the positive and negative poles of the battery 11 through the intermediary of a current-limiting device, constituted by a transistor $T_7$ and three resistances $R_{15}$, $R_{16}$ and $R_{17}$, the short-circuit current being thereby limited to about 100 milliamperes.

A diode D permits the re-charging of the battery from two pins 10A′ and 10C′ of the plug 10.

The wires 8A and 8C of the cable 8 provide the supply of the bulb 11 of the cap lamp 5 through the switch 12.

Finally, the third conductors 9B and 8B of the cables 9 and 8 permit the transmission of the high-frequency signal modulated in amplitude, between the output 10B of the transmitter 1 and the tuning circuit mounted in the casing of the cap lamp. This tuning circuit is composed of an inductance S and the condenser $C_{17}$. The latter is connected on the one hand to the hook 13 of the head of the lamp 5, and on the other hand to the return contact stud 14 of this same lamp head, through a second condenser $C_{18}$.

In accordance with a characteristic feature of the present invention, the two elements referred to above are employed to form the aerial and the earth connection of the transmitter by an adaption of the device forming the subject of the United States patent application Ser. No. 222,869, filed by the present applicant on Sept. 11, 1962, under the title: "Coupler for High-Frequency Current."

Figure 2:
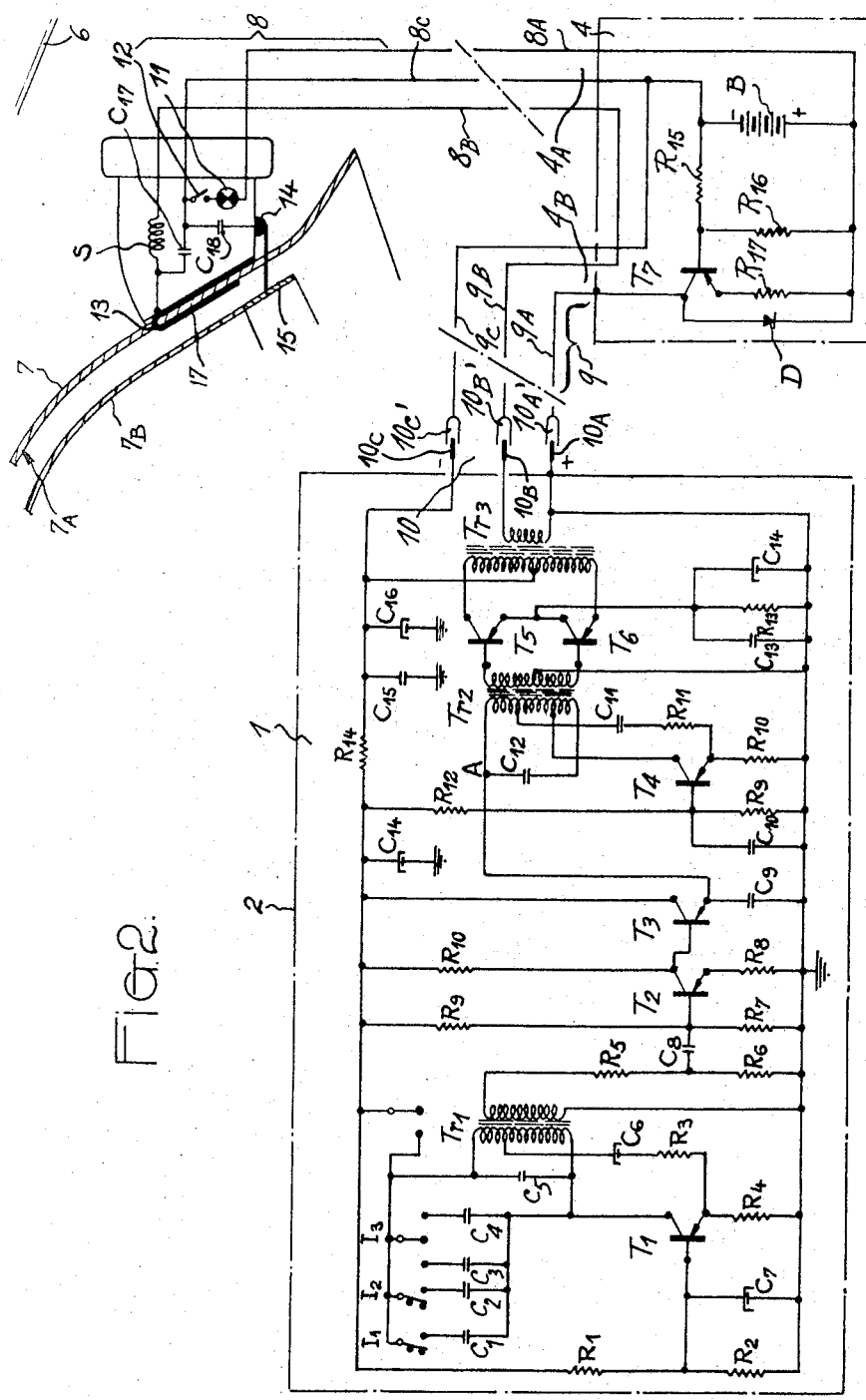
FIG. 2 represents one possible diagram of electric connections of a transmitter unit according to the invention.

To this end, the hook 13 is rigidly fixed to a metal helmet or preferably, as shown diagrammatically in FIG. 2, to the metallized face 7A of the helmet 7, while the contact stud 14 of the lamp head is connected to a flexible and adhesive metallic element 15 intended to be in contact with the forehead of the operator wearing the helmet, the said metallic element being held by the insulating cap 7B of the helmet 7.

By virtue of this arrangement, it can be seen that there is obtained a capacity coupling of the transmitter to the insulated conductor 6, the return to earth being effected through the intermediary of the actual body of the operator.

On the other hand, the helmet has a general shape such that, when looking from the insulated conductor, it has, irrespective of its orientation, a substantially constant surface which produces a sufficiently large capacity effect with the said insulated conductor.

In this way, the operator does not have to concern himself during his work either with his position or his orientation with respect to the insulated coupling conductor, especially if care has been taken to arrange this conductor in a position above his head.

The device according to the invention which has just been described has numerous advantages.

When a transmitting set operates during cutting, it emits, by means of the condenser $C_5$ continuously connected in parallel across the terminals of the primary of the transformer $T_{r1}$, a modulated high-frequency which, if it reaches the receiver at a sufficient level, permits the excitation of a safety relay. The various functions of the machine are then supplied with current, a light indicator being provided to check the excitation of this relay. However, if the transmitter becomes defective, if the carrier cable is damaged or earthed, if the receiver is defective or if the level of reception is too low as a consequence of the operator being too far away from the carrier cable 6, the relay is not excited and the various functions are not supplied. There is thus obtained a positive operational safety device.

On the other hand, one of the features of the invention resides in that the transmitter casing 1 is not provided with either serial or supply circuit, so that if any person who is not authorised to control the machine and who therefore does not possess either an adapted accumulator or a helmet-aerial of the particular types generally defined above, such persons cannot in any way employ the transmitter casing as described above.

It should furthermore be observed that the possible number of frequencies is in practice only limited by the necessity of correct filtration since, in fact, it is only necessary for the sum of the values of the capacities connected in parallel with the primary of the transformer $T_{r1}$ should be less than the maximum value of capacity permissible.

The fact that the transmitter emits a high-frequency signal modulated at low impedance, the tuning being effected by the unit $S$–$C_{17}$, enables disturbances in the transmission to be avoided, caused by, for example, the presence of the operator's hand in the immediate proximity of the cable 9.

I claim:

1. A system for the remote control of electric relay circuit means through capacitive coupling to an insulated conductor extending at least adjacent to the point of transmission comprising a portable, low-power, high-frequency transmitting means, a separately encased battery having current-limiting circuit means, operating means adapted to modulate the carrier-wave of said transmitting means in amplitude by a certain number of frequencies, each corresponding to a function of the electric relay circuit means being remotely controlled, a coupler for capacitive coupling with said insulated conductor including a helmet for wear by an operator, said helmet having at least one metallized surface insulated from said operator when worn thereby by an insulated cap, a metallic element adapted to contact said operator's forehead and thereby provide an earth return through said operator's body, a helmet lamp head provided with a suspension hook and a return contact stud, said hook being connected to said metallized surface of said helmet and said contact stud being connected to said metallic element adapted to contact said operator's forehead, and electric connecting means to connect said battery to each of said operating means, said transmitting means, and said coupler including
a first cable connected between said battery and said helmet lamp head,
and a second cable provided with a plug-in coupling to said transmitting means, connected between said battery and said transmitting means.

2. A system in accordance with claim 1, further characterized by
low-impedance circuit means connected to the aerial output of said transmitting means,
and inductance-capacitance circuit means to tune said aerial output of said transmitting means mounted in said helmet lamp head.

3. System according to claim 1, wherein, as a positive safety device, said transmitting means emits an additional frequency, which additional frequency is supplementary to said certain number of frequencies each corresponding to a function of the remote-controlled electric relay circuits.

References Cited by the Examiner
UNITED STATES PATENTS

| | | | |
|---|---|---|---|
| 1,695,172 | 12/1928 | Clement | 179—82 |
| 1,777,433 | 10/1930 | Hale | 179—82 |
| 2,876,341 | 3/1959 | Likel | 325—2 |
| 2,899,547 | 8/1959 | Crow et al. | 325—64 |
| 2,904,645 | 9/1959 | Sarles | 325—361 |
| 3,183,443 | 5/1965 | Lefevre | 325—361 |
| 3,233,239 | 2/1966 | Crow et al. | 343—255 |

NEIL C. READ, *Primary Examiner.*

A. J. KASPER, *Assistant Examiner.*